Aug. 3, 1965  J. N. BINNS  3,198,042
ROLL LATHE TAILSTOCK
Filed Jan. 31, 1962  6 Sheets-Sheet 1
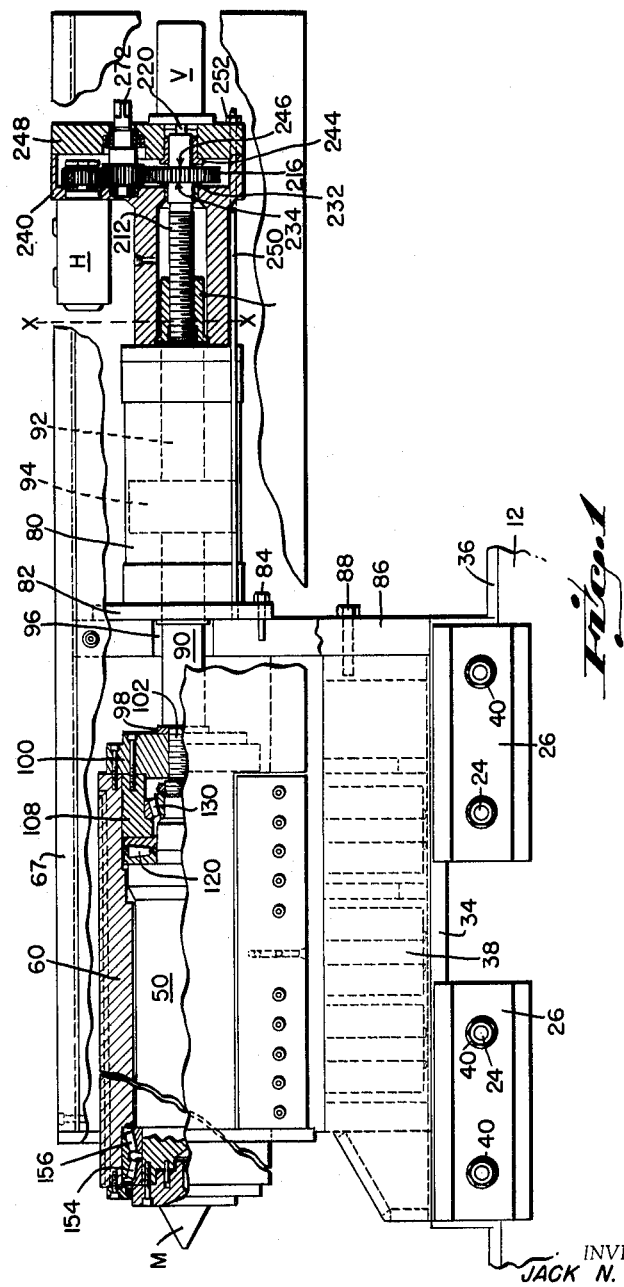
INVENTOR.
JACK N. BINNS
BY
*Warren Kinney Jr*
ATTORNEY

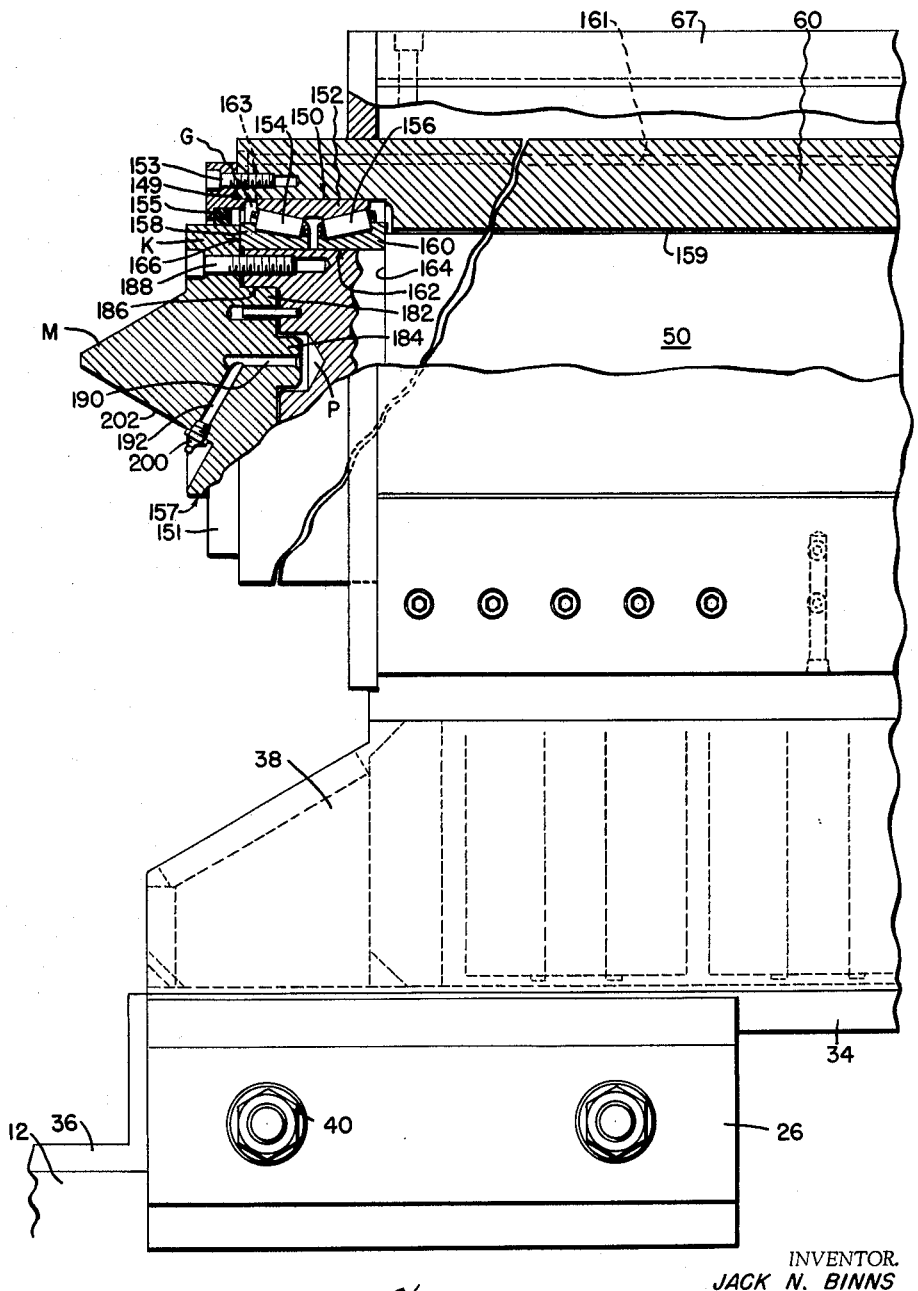

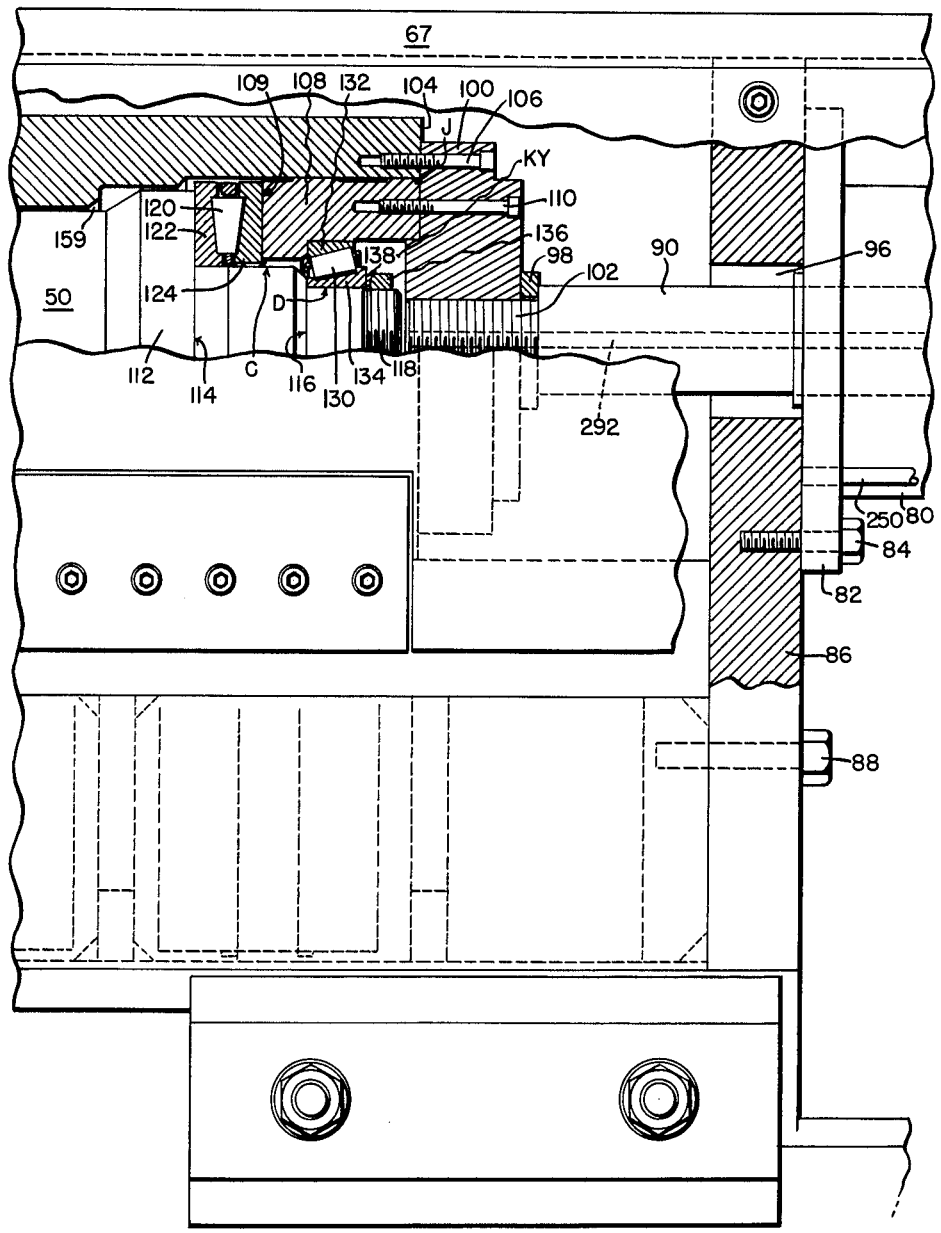

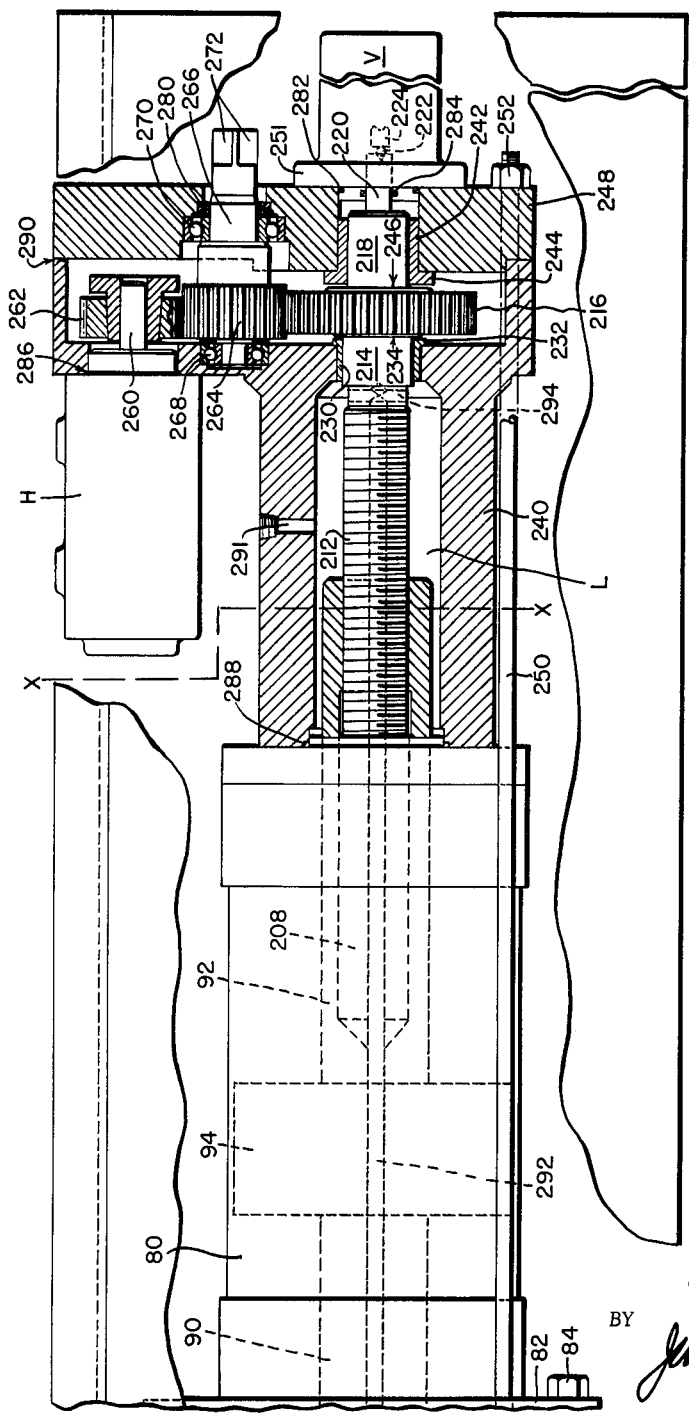

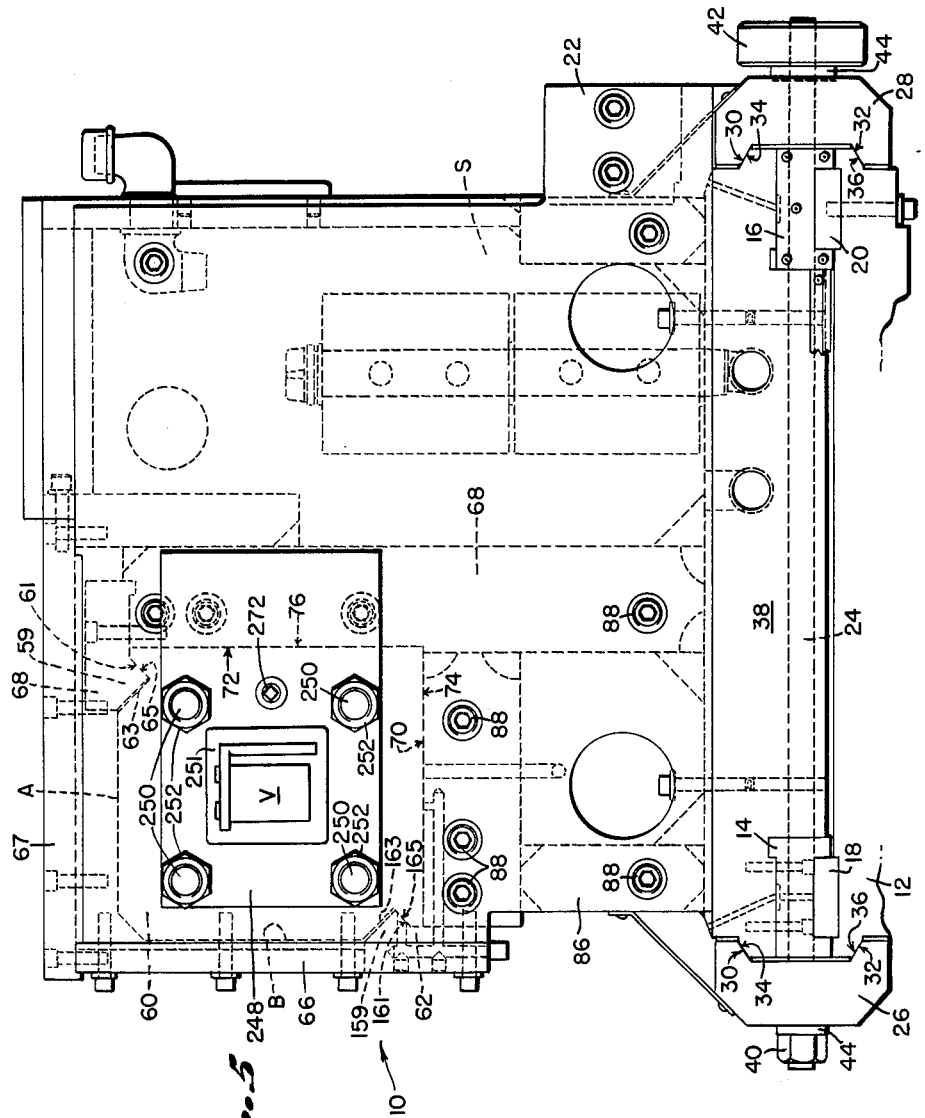

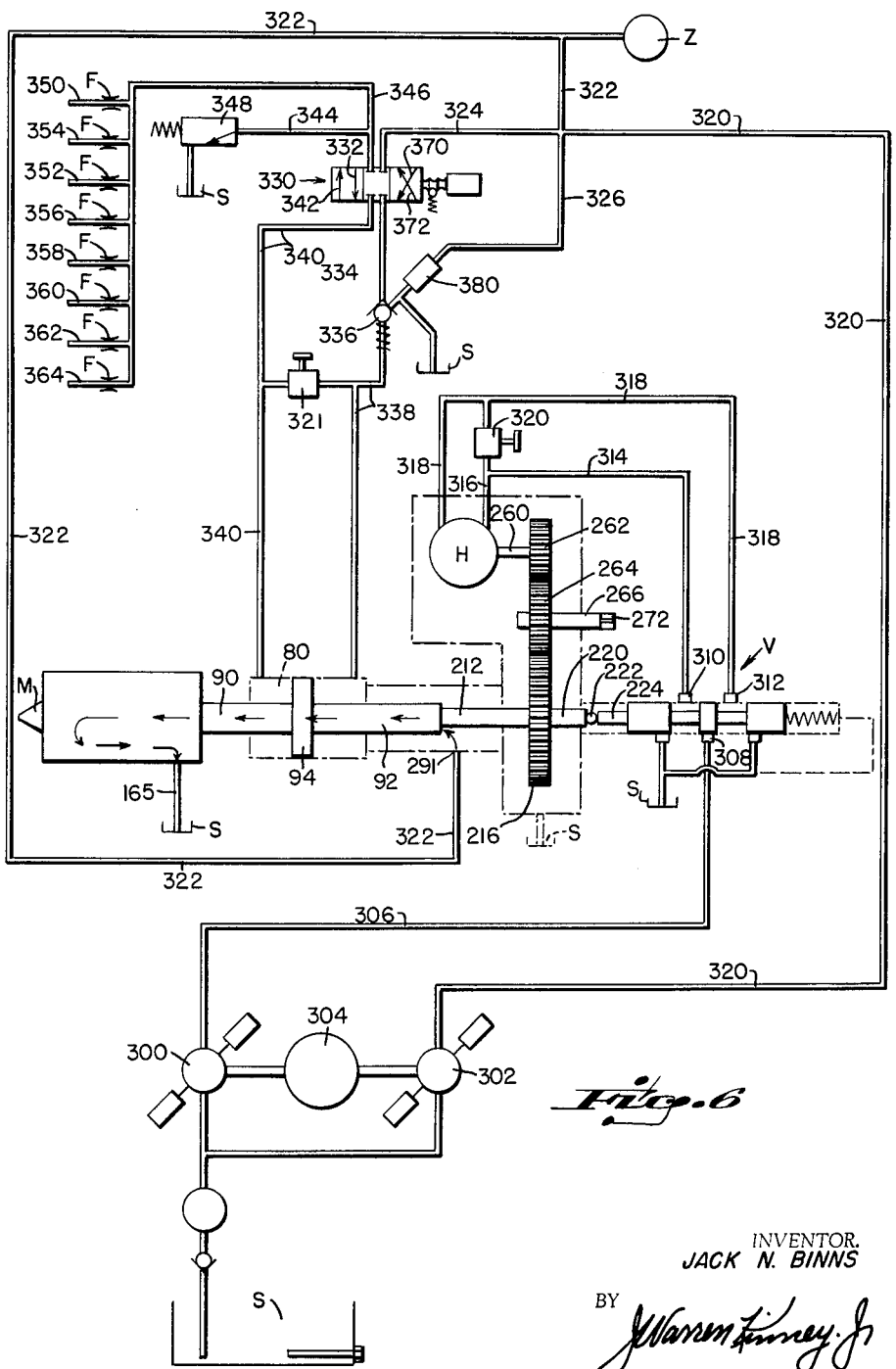

United States Patent Office 3,198,042
Patented Aug. 3, 1965

3,198,042
ROLL LATHE TAILSTOCK
Jack N. Binns, 4886 Oaklawn Drive, Cincinnati, Ohio
Filed Jan. 31, 1962, Ser. No. 170,046
20 Claims. (Cl. 82—31)

This invention relates to improvements in tail stocks, and has particular reference to a structure for use in connection with heavy duty machine tools such as roll turning lathes or the like.

An object of the present invention is the provision of an improved tail stock structure which can be particularly efficiently and effectively employed to support in a machine tool very large and heavy work pieces such as rolls for metal rolling mills.

These particular work pieces or rolls are necessarily formed from steel or corresponding material, frequently several feet in diameter and from six to eighteen or more feet in length, and often weigh in excess of a hundred thousand pounds. When such a work piece is to be held between centers for its rotation, if the head stock and its center are fixed and the tail stock center movable, even though intermediate steady rests are employed for partial weight support, a constant high clamping pressure must be exerted against the tail stock center to maintain it and thus the work piece in proper position for accurate machining of the desired surface of revolution thereon.

High speed machining or metal removal, under most favorable conditions in a work piece of this size, results in heating of the work to an extent which affects its overall length, and for this reason a fixed and unvarying clamp positioning of the tail stock center in undesirable. Heretofore it has been desirable, if not imperative, that the position of a tail stock assembly be incrementally adjusted from time to time relative to the fixed head stock in an amount which would compensate for axial work piece expansion and contraction.

One of the objects of the present invention is to provide an improved tail stock assembly in which the position of the work piece engaging center will be automatically varied to compensate for any changes in axial length of work piece due to temperature changes or otherwise, without varying the holding restraint or pressure exerted against the work piece.

A further object is the provision of a structure employing a first work piece center clamping force which may be in the nature of a high pressure—position yieldable hydraulic operating mechanism—supplemented by a concurrently power actuated mechanism for automatically locking the center in all positions against a retractive axial movement from its then existing position, in the event of pressure drop, power failure, or shut down of the machine.

Another object of the invention is the provision in connection with an axially movable hydraulic actuated tail stock center of a power operated sensitive mechanical safety follow-up mechanism continuously available and selectively effective to lock the center against accidental or unintentional retractive axial movement.

An additional object of the invention is the provision of a structure as aforesaid in which said mechanical mechanism may be alternatively utilized, when desired, for effecting axial adjustment or positioning of the tail stock center relative to the tail stock frame.

The objects of the invention also include the provision of a tail stock construction embodying an improved non-rotating, axially reciprocable quill having an axial bore therethrough in which the tail stock spindle is rotatably mounted. One of the prime objects of the invention is the provision of radial and thrust bearings which are positioned such that the spindle will take all of the thrust load and very little, if any, radial load; and wherein a minimum of bending movement is or will be imparted to the spindle in the event that some radial load is applied thereto.

A further prime object of the present invention is the provision of radial and thrust bearings which are positioned such that the quill will take all of the radial load and bending moment as the result thereof, but no thrust load.

Another object of the invention is to provide a quill-spindle construction having the hereinabove described characteristics wherein the thrust on the spindle is transmitted directly to a thrust plate which is secured to and carried by the rear end of the spindle and wherein the forces which advance, retract and/or maintain the quill-spindle combination relative to the tail stock frame are applied directly to and axially of said thrust plate from a location beyond the rear end of the spindle and quill.

Still another object of the invention is to provide a tail stock assembly with improved lubrication of the spindle and quill bearings, and additionally the provision of an improved removable center point structure and mounting including spindle engaging and interfitting parts and means for ready disassembly or removal of the center from its supporting spindle.

A further object of the invention is the provision of a novel improved hydraulic operating, controlling, and lubricating system for a tail stock assembly as aforesaid, which includes independent circuitry for power control of positioning of the work engaging center and for operation of the safety mechanism, and an additional circuitry for insuring and effecting adequate lubrication of the several slide bearing surfaces and anti-friction bearings of the tail stock assembly.

These and other objects are attained by the means described herein and as disclosed in the accompanying drawings, in which:

FIG. 1 is a side elevation of a tail stock assembly or structure embodying the teachings of the present invention with parts thereof broken away and inner structure elements shown in section.

FIG. 2 is an enlarged partially sectional view illustrating details of the forward portion or left end of the assembly of FIG. 1.

FIG. 3 is an enlarged, partially sectional view of the central portion of the assembly of FIG. 1, particularly illustrating the thrust and radial bearing mounting of the rear end of the spindle and quill.

FIG. 4 is an enlarged elevation of the rear or right end portion of the assembly of FIG. 1, with the automatic safety control adjusting mechanism shown in section.

FIG. 5 is an end or rear elevation of the right end of the assembly of FIG. 1. In each of FIGS. 1 and 4 those portions to the right of the reference line X—X have, for clarity of detail and understanding, been rotated 90° in a counterclockwise direction from the true position of said parts as illustrated in FIG. 5.

FIG. 6 is a schematic diagram of the hydraulic actuating and lubricating circuits of the assembly of FIG. 1.

With reference to the drawings, the numeral 10 denotes generally a tail stock assembly embodying the teachings of the present invention, said assembly being mounted for longitudinal movement relative to an elongate bed 12, such as, by way of example, on ways 14 and 16 which ride upon hardened guide strips 18 and 20, respectively, which are secured to and carried by bed 12, as illustrated in FIG. 5.

The numeral 22 denotes a nut bracket which is fixed relative to the movable tail stock assembly for cooperation with suitable means, not illustrated, by which the entire tail stock assembly may be moved relative to the bed.

The present invention is neither concerned with nor directed to the particular means by which a tail-stock-moving force is applied to bracket 22.

With further reference to FIG. 5, the numeral 24 denotes one of a plurality of clamp bars which extend transversely of the bed and project through companion clamp members 26 and 28 having inclined faces 30 and 32 which are engageable with complementary surfaces 34 and 36 of the tail stock base 38 and bed 12, respectively. Tension applied to clamp bar 24 via nuts 40 and 42 and washers 44 will urge the aforesaid inclined surfaces of the clamp members into tight, contacting relationship with surfaces 34 and 36 for securely though releasably locking the tail stock assembly to the bed.

With particular reference now to FIG. 1, the numeral 50 denotes a spindle which is rotatably journaled within an elongate quill 60 which is rectangular in transverse section, note FIG. 5, and which is mounted for longitudinal movement relative to the tail stock structure on gibs 62 and 64 secured to and carried by side plate 66 and element 68 of the tailstock structure, respectively. The upper surface A of the quill is provided with an elongate V or groove 63 having an inclined surface 65 which contacts and slidably engages surface 61 of the guide rib 59 of gib 64. The rear surface B of the quill is provided with an elongate V or groove 163 having an inclined surface 165 which contacts and slidably engages surface 161 of the guide rib 159 of gib 62. In this manner lower face 70 and front face 72 of the quill are disposed and maintained in slidable, contacting relationship with bearing surfaces 74 and 76 of the tail stock structure, respectively. Faces A and B are free of contact with adjacent portions of the tail stock frame, viz., upper plate 67 and side plate 66, as illustrated.

With further reference to FIG. 1, it will be noted that the quill is axially bored to receive the spindle and the various bearing assemblies by which the spindle is rotatably mounted in the quill.

Endwise axial movement of the quill relative to the tail stock structure is accomplished by means of a hydraulic motor in the form of a double acting or double end hydraulic cylinder assembly 80 which includes an integral mounting plate 82 rigidly connected, as by means of bolts 84, to the rugged rear plate 86 of the tail stock structure, which plate (86) is anchored to the rear portion of the tail stock by means of bolts 88.

The cylinder assembly includes piston rods 90 and 92 which are suitably secured to and carried by piston 94. Piston rod 90 projects through aperture 96 of rear plate 86 and terminates in a forward end which threadably engages thrust plate or abutment end plate 100 at 102. A thrust washer 98 may be interposed between adjacent faces of rod 90 and plate 100, as illustrated in FIGS. 1 and 3.

Thrust plate 100 is rigidly secured to the rear end 104 of quill 60 by bolts 106; and a bearing spacer ring or collar 108 having a forward axial face 109 is anchored to the thrust plate by bolts 110.

With particular reference now to FIG. 3, it will be noted that the rear portion of spindle 50 is provided with an annular portion 112 having a rear axial face 114; a cylindrical portion C of reduced diameter having a rear axial face 116; and a reduced terminal portion D, the end of which is externally threaded as at 118.

A thrust bearing 120 is disposed between races 122 and 124 whose respective axial faces engage axial faces 114 and 109 of the spindle and bearing spacer ring 108, respectively.

In the preferred embodiment of the invention, a radial or stabilizer bearing 130 is disposed between the terminal portion D of the spindle and the bearing spacer ring 108, wherein the outer race 132 engages the bearing spacer and the inner race 134 is carried on portion D of the spindle to which it is secured with its forward end abutting axial face 116 of the spindle by reason of nut 136 engaging the threaded portion 118 of the spindle.

The numeral 138 denotes a thrust washer disposed between the nut and inner race.

The letter J denotes an O-ring, or other suitable sealing member, interposed between the adjacent portions of thrust plate 100, quill 60 and bearing spacer 108 for providing a fluid tight joint, for reasons hereinafter more fully apparent.

With reference now to FIG. 2, it will be noted that the forward end of the quill is recessed as at 150 for receiving the outer race 152 of a pair of radial bearings 154 and 156. The inner races 158 and 160 are received on cylindrical portion 162 of the spindle which defines an axial face 164 which is engageable by the rear face of race 160.

The forward face of race 158 is engaged by the axial face 166 of peripheral portion K of a removable center denoted generally by the letter M.

The outer race 152 is unrestrained, that is, it is not confined against axial, endwise movement relative to the quill within recess 150; therefore, no thrust load is imparted to the quill which will take only radical loads and bending movement.

From the foregoing, it will be noted that the spindle will take all of the thrust load and very little, if any, radial load; but in any event, the spindle will never be subjected to more than a minimum bending moment as the result of a radial load applied thereto.

With further reference to FIG. 2, it will be noted that the forward end of the spindle is suitably recessed to receive the annular concentric, forwardly projecting portions 182 and 194 of center M, and to provide an interference fit therewith as at 186. The center M may be securely though releasably anchored to the forward end of the spindle by means of bolts 188.

The numerals 190 and 192 denote interconnected passageways which extend between a closed chamber P defined by the adjacent surfaces of the spindle and center to the right of the interference fit at 186. A grease fitting 200 which is accessible from the exterior of conical face 202 of the center M is disposed for communication with passageway 192, as illustrated. The introduction of fluid under pressure into chamber P, via fitting 200, after bolts 188 have been removed, will conveniently eject center M from spindle 50.

With further reference to FIG. 2, it will be noted that an annular seal retainer ring 151 may be secured to and carried by the forward end of the quill by bolts 153. An O-ring 149 is interposed between said ring and the quill, and a lip seal 155 is provided in spanning relationship between the retainer ring and annular surface 157 of center M for providing an oil-tight lubricant chamber G which is in open communication with chamber KY at the rear end of the spindle and quill via clearance 159 between the spindle and quill.

The numeral 161 denotes an oil return line which is provided in and extends through the quill and which is in open communication with chamber G via passageway 163. Return line 161 is suitably connected to a sump S, see FIG. 6, by suitable piping such as 165.

QUILL STOP

With reference now to FIG. 4, it will be noted that the major portion of piston rod 92 is axially bored as at 208 and internally threaded to receive and engage the external threads of a lead screw 212 formed integral with inner shaft element 214, gear 216, and outer shaft element 218, which latter element terminates in an outwardly projecting stem 220 of reduced diameter having a suitable indentation in the free outer end thereof for partially receiving and centering a ball 222 interposed between the end of stem 220 and the end of the axially shiftable actuator shaft 224 of a conventional hydraulic servo-valve indicated generally by the letter V, which is secured to and carried by plate 248 by bolts 249 which extend through the mounting bracket 251 of the servo-valve.

Inner shaft element 214 is journaled for rotation in a bushing 230 secured to and carried by the quill stop case 240, as illustrated, wherein the gear-adjacent end of the bushing is provided with an outturned peripheral bearing lip 232 having an axial face engageable by the axial face 234 of the hub of the gear 216.

Outer shaft element 218 is journaled for rotation in bushing 242 which includes an outturned peripheral bearing lip 244 of substantial proportions having an axial face engageable by the axial face 246 of the other hub of gear 216. Bushing 242 is secured to and carried by rear or cover plate 248 which is securely and rigidly, though releasably, anchored in position by means of tie rods 250 and 252. Those ends of the rods remote from nuts 252 threadably engage mounting plate 82 of the cylinder assembly.

The axial faces 234 and 246 of the hub of gear 216 are normally spaced from and out of contact with the adjacent faces of bushings 230 and 242, thereby permitting limited endwise, axial movement of the gear relative to said bushings. Any endwise or axial movement of the gear will, of course, be transmitted to actuator shaft 224 of the hydraulic servo-valve V via stem 220 and ball 222 for controlling both the speed and direction of rotation of hydraulic motor H.

Motor H includes a shaft 260 to which a gear 262 is suitably secured for driving engagement with an idler gear 264 which is keyed to or integral with shaft 266 suitably journaled for rotation relative to the quill stop case 240 and plate 248 as by bearings 268 and 270. The free end of shaft 266 projects outwardly beyond the rear face of plate 248 and is provided with flats, or the like, denoted by the numeral 272 to accommodate a hand crank.

The numeral 280 denotes a suitable oil seal surrounding shaft 266; and the numerals 282, 284, 286 and 288, of FIG. 4, denote sealing members, such as O-rings, and the numerals 290 a sealing element or gasket for providing an oil tight housing for the quill stop case.

An oil intake or inlet to chamber L is indicated at 291, whereas the numeral 292 denotes an oil passageway which extends throughout the entire length of piston rods 90 and 92, and through piston 94. A radial bore 294 places passageway 292 in open communication with the interior of chamber L.

From the foregoing, it will be noted that rotation of gear 216 will cause lead screw 212 to be fed into or out of piston rod 92, and the purpose of the hydraulic servo-valve mechanism V is to correlate the speed and direction of rotation of lead screw 212 with the direction and rate of axial movement of piston rod 92 incident to actuation of piston 94 of the hydraulic cylinder 80, so that gear 216 will remain in spaced relationship with the axial faces of bushings 230 and 242.

If the rate of linear travel of the piston to the left (of FIG. 4) should exceed the rate at which lead screw 212 is being retracted from piston rod 92, the lead screw, gear 216, and stem 220 will be shifted to the left for thereby actuating valve V to increase the speed of motor H for increasing the rate of rotation of the lead screw to compensate for the rate of travel of the piston. Quite obviously, if the rate of rotation of the lead screw is not speeded up, face 234 of the hub of gear 216 will be shifted to the left into interfering relationship with the axial face of lip 232 of bushing 230.

By the same token, movement of the piston to the right (FIG. 4) will tend to shift the lead screw 212, gear 216, and stem 220 to the right for actuating shaft 224 of valve V to drive motor H at such a rate and in such a direction as to rotate the lead screw into threaded engagement with piston rod 92 for fully compensating for the axial movement of the piston, whereby gear 216 will be maintained in spaced relationship with respect to the axial faces of the bearing lips of bushings 230 and 242.

The primary purpose of the quill stop mechanism is to provide efficient, positive means which will positively preclude accidental and/or unintentional retraction of the spindle and quill in the event of hydraulic failure, which failure would, or could, but for the quill stop aforesaid, result in the quill being retracted and the center M withdrawn from the workpiece with disastrous results.

The aforesaid quill stop will positively prevent unintentional or accidental retraction of the quill by an amount greater than the normal spacing of an eighth of an inch or less between surface 246 of the hub of gear 216 and the adjacent axial face of lip 244 of bushing 242, in the event of hydraulic failure.

Since, in the event of hydraulic failure, relative motion between the screw and piston rod 92 will be prevented whereby retraction of the quill and spindle will cause surface 246 of bushing 242 for transmitting the axial or thrust load of the spindle to rear plate 248, nuts 252, tie rods 250, mounting plate 82, and bolts 84 back to the rear plate 86 of the tailstock structure.

HYDRAULIC SYSTEM

With particular reference now to FIG. 6, the numerals 300 and 302 denote a pair of commercial pressure-compensated pumps suitably driven by a motor 304. The characteristics of pump 300 are such as to provide and maintain a constant pressure within line 306 which is connected to the inlet port 308 of the hydraulic servo-valve mechanism indicated generally by the letter V. Outlet port 310 and valve V is suitably connected by means of conduits 314 and 316 to one side of reversible hydraulic motor H; and outlet port 312 is suitably connected by conduit 318 to the other side of said motor. A manually controlled valve 320 is interposed between conduits 314 and 318 as illustrated for a reason which will hereinafter be more fully explained.

The present invention is neither directed to nor concerned with the particular structural details of the servo-valve V, it being understood that said valve is adapted to cause motor H to rotate in one direction for rotating and withdrawing lead screw 212 from piston rod 92 incident to movement of said rod to the left (as viewed in FIG. 6); and to rotate motor H in the opposite direction for advancing the lead screw into piston rod 92 incident to movement of said rod to the right (as viewed in FIG. 6).

Pump 302 is adapted to provide lubricating oil under pressure through conduit 320 to conduits 322, 324 and 326, wherein conduit 322 is in open communication with passageway 291 of chamber L (see FIG. 4) of the quill stop mechanism. The lubricating oil thus pumped into chamber L will completely lubricate all of the moving parts of FIG. 4 and also pass forwardly between the quill and spindle via opening 159 (FIG. 2), thence forwardly to chamber G, thence through passageways 163 and 161 (of FIG. 2) through conduit 165 (FIG. 6), into a common sump S.

The fluid under pressure in conduit 320 is also utilized for actuating piston 94 of cylinder 80 for advancing, holding and/or retracting the quill and spindle assembly relative to the tailstock structure. A manually operable directional four-way valve denoted generally by the numeral 330 may be utilized for interrupting the flow of fluid under pressure to cylinder 80, or for selectively providing fluid under pressure to one or the other sides of piston 94.

The piston will be advanced incident to movement of valving member 330 to the right whereby passageway 332 will connect conduit 324 in open communication with conduit 334, through check valve 336 and conduit 338 to the right end of cylinder 80, in which event the left end of said cylinder will be exhausted through conduit 340 which will be placed in open communication by means of passageway 342 of valve 330 in open communication with conduits 344 and 346, wherein conduit 344 is connected to common sump S through a suitable relief valve 348.

The numeral 336 indicates generally a pilot operated check valve, the pilot being indicated at 380 on FIG. 6. Check valve 336 is closed only when the pressure on pilot operating device 380 fails to provide sufficient pressure from pump 302 to open it. The pilot operated valve 336 is merely a safety device which in the case of loss of pressure for any reason will positively preclude the retraction of piston 94, which retraction would allow the workpiece to drop out from between centers.

The numeral 348 denotes a relief valve in the exhaust lines 344 and 346 of the system for the purpose of maintaining pressure in the system above the pressure-setting for pressure switch Z so that center M and piston 94 can be moved back and forth without restriction of the workpiece engaging them to maintain pressure in the system. The fluid passing through conduit 346 will be fed through bleeders or "BIJUR" fittings F into lubrication lines 350, 352, 354, 356, 358, 360, 362 and 364, which are in open communication with suitable conduits, not illustrated, which supply lubricant to the adjacent contacting surfaces 70–74 and 72–76 of the quill and quill support, and to the V-way slide bearings at surfaces 61–65 and 161–165 as illustrated in FIG. 5.

At this point it should be noted that piston 94 will be shifted to the left for causing center M to engage and then exert sufficient axial thrust to one end of a roll for mounting said roll for rotation between the headstock and a tailstock assembly, not illustrated. In order to insure proper and continuous seating of center M with the tailstock end of a roll, hydraulic pressure will be continuously maintained on the right said of piston 94. In this manner any expansion or contraction of the workpiece resulting in axial elongation or shortening thereof will be automatically and continuously compensated for by reason of such axial movement being transmitted directly to the piston which will be automatically retracted or advanced to maintain a constant axial force to the workpiece via center M, by reason of the setting of pressure compensated pump 302 to automatically accommodate and compensate for elongation or shortening of the workpiece by changing the volumetric displacement to provide constant pressure to the system even though the volumetric demand of the system may fluctuate.

The letter Z denotes a pressure switch which is adapted to automatically stop the machine and prevent it from being operated during those periods of time when the pressure in line 320 falls below a certain predetermined or pre-set value.

Th enumeral 321 denotes a manually operable valve which is normally closed.

If the hydraulic system should fail, spindle M can only retract a fraction of an inch to the right, as determined by contact of face 246 of the hub of gear 216 with the axial surface of bearing lip 244 of the bushing 242, as already set forth.

The spindle may be retracted by manipulating valve 300 for placing passageway 370 thereof in open communication between conduits 324 and 340 and for placing passageway 372 in open communication with conduits 334 and 346. During such retraction of piston 94 check valve 336 will be opened for permitting flow of oil from conduit 338 into 334; said check valve being open by reason of the application of line pressure through conduit 326 which actuates the pilot actuated check valve denoted generally by the numeral 380. As before, the fluid in conduit 346 will be fed to conduits 350 through 364 inclusive for lubricating the quill.

When the machine is shut down the quill and spindle assembly may be advanced or retracted manually by rotating gear 264 by a wrench, crank or handwheel applied to the squared end 272 of shaft 266; after, however, both of valves 320 and 321 have been manually opened for permitting the free, unrestricted passage of fluid through or relative to motor H and cylinder 80.

Manual operation of gear 264 will cause lead screw 212 to be rotated relative to piston rod 92 for intially shifting gear 216 until an axial force of its hub engages and abuts against a corresponding axial face of the bearing lip of an adjacent bushing 230 or 242; thereafter further rotation of the lead screw in the same direction will impart endwise axial movement to piston rod 92, and those structural elements which are directly or indirectly secured thereto.

What is claimed is:

1. A roll lathe tail stock including a frame having interior angularly related slide bearing faces, a hollow quill mounted in the frame having angularly related exterior bearing faces interfitting with the slide faces of the frame and guided thereby, a live tail center spindle mounted in said hollow quill having a terminal cone center, said quill having a radial bearing receiving recess formed in its forward end and a bearing receiving chamber formed in its rear end, a radial anti-friction bearing mounted on the forward end of the spindle adjacent the center, said bearing having an outer race slidably mounted in the recess of the quill, an end-thrust anti-friction bearing mounted on the rear portion of the spindle and disposed within the chamber of the quill, a spacing ring forming a closure for the rear end of said chamber and an abutment stop for the end-thrust bearing, a thrust plate secured to the rear face of the quill, retaining the spacing ring in position, in the chamber of the quill to transfer the end thrust on the cone and its spindle directly to said thrust plate, a radial-thrust anti-friction bearing intervening the rear end of the spindle and said spacing ring, and power operated means connected to said thrust plate for axially moving the quill and spindle and receiving thrust directly from the load on the spindle.

2. A machine tool tail stock including a frame having interior angularly related slide bearing faces, a hollow quill mounted in the frame having angularly related exterior bearing faces interfitting with the slide faces of the frame and guided thereby, a live tail center spindle mounted in said hollow quill having a terminal cone center, said quill having a radial bearing receiving recess formed in its forward end and a bearing receiving chamber formed in its rear end, a radial bearing mounted on the forward end of the spindle adjacent the center, said bearing having an outer race slidably mounted in the recess of the quill, an end-thrust bearing mounted on the rear portion of the spindle and disposed within the chamber of the quill, a spacing collar forming a closure for the rear end of the chamber and an abutment stop for the end-thrust bearing, an abutment end plate secured to the rear face of the quill retaining the collar in position in the chamber of the quill to transfer the end-thrust on the cone and its spindle directly to said end plate, and a radial-thrust bearing intervening the rear end of the spindle and the collar, a hydraulic quill-operating motor including a cylinder secured to the frame, a piston slidable in the cylinder and a forwardly extending piston rod connecting the piston and end plate for effecting endwise reciprocation of the quill and spindle in correspondence with movements of the piston.

3. A machine tool tail stock including a frame having interior angularly related slide bearing faces, a hollow quill mounted in the frame having angularly related exterior bearing faces interfitting with the slide faces of the frame and guided thereby, a live tail center spindle mounted in said hollow quill having a terminal cone center, said quill having a radial bearing receiving recess formed in its forward end and a bearing receiving chamber formed in its rear end, a radial bearing mounted on the forward end of the spindle adjacent the center, said bearing having an outer race slidably mounted in the recess of the quill, an end-thrust bearing mounted on the rear portion of the spindle and disposed within the chamber of the quill, a spacing collar forming a closure for the rear end of the chamber and an abutment stop for the thrust-bearing, an abutment end plate secured to the rear face of the quill retaining the collar in position in the chamber of the quill to transfer the end-thrust on the cone and its spindle directly to the abutment end plate, a radial-thrust bearing intervening the rear end of the spindle and the collar, a hydraulic quill operating motor including a cylinder secured to the frame, a piston slidable in the cylinder and a forwardly extending piston rod connecting the piston and abutment end plate for effecting endwise reciprocation of the quill spindle in correspondence with movements of the piston, a second piston rod extending rearwardly from the piston, and a mechanical thrust-take-up-mechanism coupled to and reacting on the said second piston rod to limit movement of the piston and coupled quill and spindle.

4. A machine tool tail stock including a frame having interior angularly related slide bearing faces, a hollow quill mounted in the frame having angularly related exterior bearing faces interfitting with the slide faces of the frame and guided thereby, a live tail center spindle mounted in said hollow quill having a terminal cone center, said quill having a radial bearing receiving recess formed in its forward end and a bearing receiving chamber formed in its rear end, a radial bearing mounted on the forward end of the spindle adjacent the center, said bearing having an outer race slidably mounted in the recess of the quill, an end-thrust bearing mounted on the rear portion of the spindle and disposed within the chamber of the quill, a spacing collar forming a closure for the rear end of the chamber and an abutment stop for the end-thrust bearing, an abutment end plate secured to the rear face of the quill retaining the collar in position in the chamber of the quill to transfer the end-thrust on the cone and its spindle directly to said end plate, a radial-thrust bearing intervening the rear end of the spindle and the collar, a hydraulic quill operating motor including a cylinder secured to the frame, a piston slidable in the cylinder and a forwardly extending piston rod connecting the piston and abutment end plate for effecting reciprocation of the quill and spindle in correspondence with movements of the piston, and a mechanical thrust take-up coupled to and reacting on the piston to limit its reciprocating movement, said mechanism including a lead screw, an actuating motor for the lead screw, and an end-thrust-actuatable servo for controlling the operation of the lead screw actuating motor.

5. A tail stock for a heavy duty roll lathe, including a frame, a quill mounted in the frame for longitudinal sliding movement, means restraining the quill against rotation, a live tail center spindle rotatably supported by the quill, a reciprocating hydraulic motor including a piston and cylinder carried by the frame, means coupling the piston to the quill for effecting power positioning of the quill relative to the frame, and an auxiliary mechanical control for the position of the piston and quill relative to the frame including a lead screw coupled to the piston for bodily movement therewith and relative thereto, abutment means for limiting the joint bodily movement of the piston and screw in either of two opposite axial directions, and driving means for effecting rotation of the screw in opposite directions to increase or decrease the effective overall length of the combined coupled quill, piston and screw to effect positioning of the quill.

6. The construction as specified in claim 5, in which the driving means includes a manually operable member for effecting rotation of the screw to effect positioning of the quill.

7. The construction as specified in claim 5, in which the driving means for effecting rotation of the screw includes a motor and a servo control connected to the motor, cooperating with the screw, and actuatable by axial movements of the screw to control the operation of the motor.

8. A tail stock unit for a machine tool, including a frame having rectangularly related portions providing a wide horizontal basal slide surface and a wide vertical slide surface at one side of and perpendicular to said basal surface, a quill slidably mounted in the frame having corresponding basal and side slide surfaces for inter-engagement with the said surfaces of the frame, the quill having a longitudinally extending V-way guide groove formed in its opposite side surface and in a top surface and guide blocks secured to the frame portions having V-guides for engagement in the grooves of the quill, whereby said guides and grooves secure the quill for longitudinal sliding movement while preventing twisting or binding thereof as respects the slide surfaces.

9. In combination, a tail stock structure for a machine tool, including a frame having rectangularly related portions providing basal and lateral slide surfaces, a quill slidably mounted in the frame having corresponding slide surfaces for inter-engagement with the surfaces of the frame, the quill having longitudinally extending V-way guide grooves formed in its slide surfaces and guide blocks secured to the frame portions having V-guides for engagement in the grooves of the quill, whereby said guides and grooves support the quill for longitudinal sliding movement while preventing twisting or binding thereof as respects the slide surfaces, said quill being interiorly channeled to provide a lubricant passageway, and being formed with an axially extending spindle-receiving bore, a live tail center spindle rotatably mounted in said bore, anti-friction bearings supporting the spindle within said bore and spaced from the surface thereof, a hydraulic actuating motor for actuation of the quill having a hollow piston rod coupled to the quill and communicating with said bore and said bore communicating at its forward end with said passageway, and a pressure lubrication system including a sump, a motor actuating pressure pump drawing oil from the sump, means including a motor actuating pressure conduit for connecting the pump to the motor, a distribution conduit from the pressure conduit coupled to discharge lubricant through the piston rod to the bore of the quill and by way of the bearings to the lubricant passageway and thence to the sump, and another distribution conduit from the pressure conduit coupled to discharge lubricant to the outer slide faces of the quill, and conduit means for returning the lubricant to the sump.

10. In combination, a tail stock structure for a machine tool, including a frame having rectangularly related portions providing basal and lateral slide surfaces, a quill slidably mounted in the frame having corresponding slide surfaces for inter-engagement with the surfaces of the frame, the quill having longitudinally extending V-way guide grooves formed in its slide surfaces and guide blocks secured to the frame portions having V-guides for engagement in the grooves of the quill, whereby said guides and groove support the quill for longitudinal sliding movement while preventing twisting or binding thereof as respects the slide surfaces, said quill being formed with an axially extending spindle receiving bore, a live tail center spindle rotatably mounted in said bore, anti-friction bearings supporting the spindle at both ends within and spaced throughout its length from the surface of said bore, a hydraulic actuating motor for actuation of the quill having a hollow piston rod coupled to the quill and communicating with the bore, means including the space between the spindle and the surface of the bore for conducting lubricant to the said bearings, and a pressure lubrication system including a sump, a motor actuating pressure pump drawing oil from the sump, means including a motor actuating pressure conduit for connecting the pump to the motor, a distribution conduit from the pressure conduit coupled to discharge lubricant through the piston rod into the bore of the quill, the frame having oil passages formed therein for discharge of lubricant at the slide surfaces, and conduits connecting the motor and passages for discharge of lubricant to the slide surfaces by way of the conduits and passages.

11. The construction as specified in claim 10, in which a first means is provided to determine the maximum pressure available for distribution through the conduits and additional means are provided for independent control of the flow of lubricant to individual passages.

12. In a machine tool tail stock mechanism, a tail stock, a piston-reciprocated work-engageable center, a safety locking device for the piston-reciprocated work-engageable center, said mechanism including an axially extending lead screw having threaded engagement with the piston, means on the tail stock restraining the lead screw to limited bodily axial movement relative to the tail stock, power operable means for effecting a compensating rotation of the lead screw to permit unrestrained axial movement of the piston, movement of the piston from one direction to another tending to effect the bodily axial movement of the lead screw therewith, and a servo-control for the power operable means having a follow-up member engaging the screw and actuatable upon bodily axial movement of the lead screw to energize the power operable means.

13. In a machine tool tail stock mechanism, a tail stock, a piston-reciprocated work-engageable center, a safety locking device for the piston-reciprocated work-engageable center, said mechanism including an axially extending lead screw having threaded engagement with the piston, means on the tail stock restraining the lead screw to limited bodily axial movement relative to the tail stock, power operable means for effecting a compensating rotation of the lead screw to permit unrestrained axial movement of the piston, movement of the piston from one direction to another tending to effect a simultaneous bodily axial movement of the lead screw therewith, a servo-control for the power operable means having a follow-up member engaging the screw and actuable upon axial movement of the screw to energize the power operable means, an activatable source of power, and means to de-activate the source to de-energize said means and prevent rotation of the lead screw.

14. In a machine tool, a tail stock, a tail stock reciprocating quill having a work engaging center, a hydraulic system for control of the tail-stock-reciprocating-quill, said system including a double end hydraulically operable motor for movement of the quill, a mechanical safety device for control of the quill, including a screw coupled for movement with and rotation relative to the quill, a second motor for rotation of the screw, and a servo-control for the second motor, said system including a pair of pressure producing pumps, a motor for operation of the pumps, a pressure switch effective to stop the motor and pumps upon a drop in the pump effected pressure, a first power circuit activated by one of the pumps having a pressure conduit coupled to energize the switch and the quill motor, a second circuit for the second motor energized by the second pump, and a servo-control for the second motor operatively associated with and actuatable by axial movement of the screw.

15. In a machine tool, a tail stock, a tail stock reciprocating quill having a work engaging center, a hydraulic system for control of the tail stock reciprocating quill, said system including a double end hydraulically operable motor for movement of the quill, a mechanical safety device for control of the quill, including a screw coupled for movement with and rotation relative to the quill, a second motor for rotation of the screw, a servo control for the second motor, said hydraulic system including a pair of pressure producing pumps, a motor for operation of the pumps, a pressure switch effective to stop the motor and pumps upon a drop in the pump effected pressure, a first power circuit activated by one of the pumps having a pressure conduit coupled to energize the switch and the quill motor, a second circuit for the second motor energized by the second pump, a servo control for the second motor operatively associated with and actuatable by movement of the screw, a pair of motor conduits coupled to opposite ends of the quill operating motor, a reversing valve intervening the pressure conduit and the pair of motor conduits and actuatable to connect the pressure conduit to one or the other of said motor conduits to determine the direction of actuation of the motor, a discharge conduit leading from the valve, and means for controlling the pressure in the discharge conduit.

16. In a machine tool, a tail stock, a tail stock reciprocating quill having a work engaging center, a hydraulic system for control of the tail stock reciprocating quill, said system including a double end hydraulically operable motor for movement of the quill, a mechanical safety device for control of the quill, including a screw coupled for movement with and rotation relative to the quill, a second motor for rotation of the screw, a servo-control for the second motor, said system including a pair of pressure producing pumps, a motor for operation of the pumps, a pressure switch effective to stop the motor and pumps upon a drop in the pump effected pressure, a first power circuit activated by one of the pumps having a pressure conduit coupled to energize the switch and the quill motor, a second circuit for the second motor energized by the second pump, a servo-control for the second motor operatively associated with and actuatable by axial movement of the screw with the quill, a pair of motor conduits coupled to opposite ends of the quill operating motor, a reversing valve intervening the pressure conduit and the pair of motor conduits and actuatable to connect the pressure conduit to one or the other of said motor conduits to determine the direction of actuation of the motor, a discharge conduit leading from the valve, means for controlling the pressure in the discharge conduit, a branch lubricating conduit coupled to the discharge conduit, and lubricant distributing conduits extending from said branch conduit to slide bearing surfaces in the tail stock.

17. In a machine tool, a tail stock, a tail stock reciprocating quill having a work engaging center, a hydraulic system for control of the tail stock reciprocating quill, said system including a double end hydraulically operable motor for movement of the quill, a mechanical safety device for control of the quill, including a screw coupled for movement with and rotation relative to the quill, a second motor for operation of the screw, a servo-control for the second motor, said system including a pair of pressure producing pumps, a motor for operation of the pumps, a pressure switch effective to stop the motor and pumps upon a drop in the pump effected pressure, a first power circuit activated by one of the pumps having a pressure conduit coupled to energize the switch and the quill motor, a second circuit for the second motor energized by the second pump, a servo control for the second motor operatively associated with and actuatable by movement of the screw with the quill, a pair of motor conduits coupled to opposite ends of the quill operating motor, a reversing valve intervening the pressure conduit and a pair of motor conduits and actuatable to connect the pressure conduit to one or the other of said motor conduits to determine the direction of actuation of the motor, a check valve in one of the pair of motor conduits intermediate the reversing valve and the motor effective when closed to block return flow from the motor and impound impelling fluid then present in the motor, and pressure actuatable means operatively connected to the pressure conduit intermediate the pressure pump and the reversing valve, operative by pressure in the conduit to hold the check valve in open, non-blocking position.

18. A machine tool tail stock, including a work engaging center, a reciprocable mounting for the center including a spindle, a reciprocating hydraulic motor for moving and yieldably holding the spindle and center in work clamping position, a hydraulic power circuit, reversing means for coupling the circuit to the motor to effect its reciprocation, a lead screw, means mounting the lead screw in the tail stock for rotation and for restricted axial movement, a threaded connection between the lead screw and the motor, whereby the limited axial movement of the lead screw provides a variable restriction for movement of the center, a servo-controlled motor for rotation of the lead screw, and a servo-valve for control of the motor operatively associated with the lead screw and actuatable by axial movement of the lead screw to actuate the servomotor for compensatory rotative adjustment of the lead screw.

19. In a machine tool tailstock assembly, a rotatable center-supporting spindle having a concentric socket formed in an end thereof, a work-positioning center having a peripheral attaching flange, a centering cone projecting at one side of the flange and a cylindrical centering portion projecting oppositely therefrom concentrically fitted into the socket of the spindle, the body of said center having a conduit passage extending from the surface of the cone through the cylindrical portion to the surface of the base thereof, whereby a pressure media may be introduced through said pasage to the socket to facilitate removal of the center from the spindle, and removable securing means fastening the flange to the spindle end outwardly of the socket thereof.

20. A roll lathe tailstock including an elongate frame having interior angularly related slide bearing faces, an elongate, hollow quill mounted in the frame having angularly related exterior bearing faces interfitting with the slide faces of the frame and guided thereby, a live tail center spindle mounted in said hollow quill, means at both ends of the spindle rotatably mounting the spindle to the quill, said means supporting the spindle to take all of the thrust load and relatively little bending moment and whereby the quill will take radial load and bending moment but none of the thrust of a load applied to the spindle.

References Cited by the Examiner
UNITED STATES PATENTS

| | | | |
|---|---|---|---|
| 1,821,331 | 9/31 | Svenson | 82—31 |
| 1,891,220 | 12/32 | Bath | 82—31 X |
| 1,921,502 | 8/33 | Brill | 82—31 |
| 2,042,123 | 5/36 | Pierle | 82—31 X |
| 2,326,106 | 8/43 | Van Ness et al. | |
| 2,493,475 | 1/50 | Casella et al. | 82—31 |
| 2,586,127 | 2/52 | Von Zelewsky | 82—31 |
| 2,614,447 | 10/62 | Lomazzo | 82—31 |

WILLIAM W. DYER, JR., *Primary Examiner.*